J. S. Manning.
Mower  Patented Jan. 22, 1856.
Nº 14138
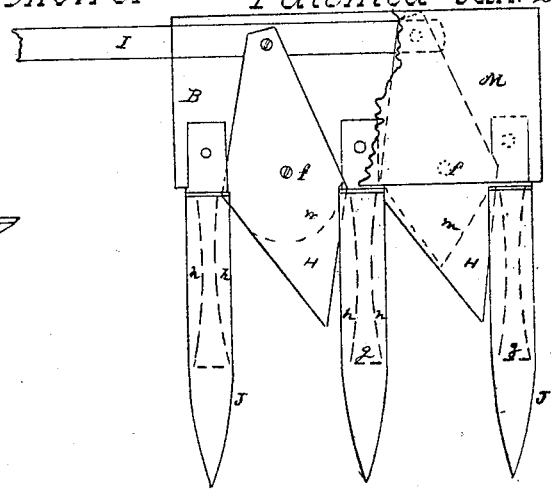
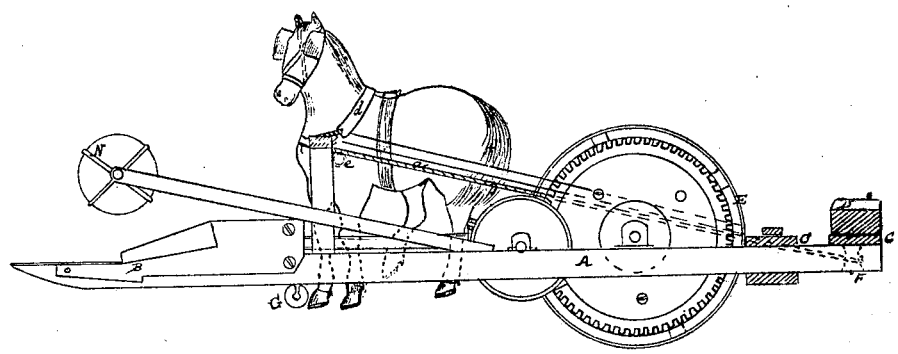
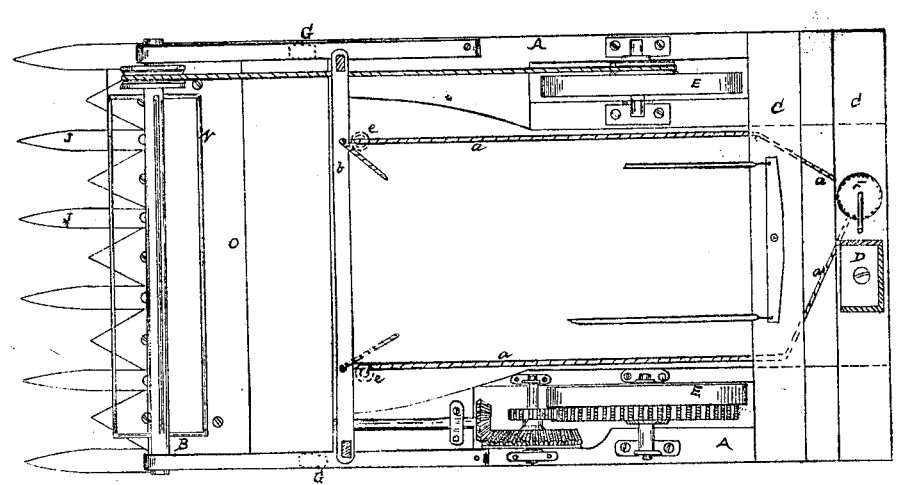

UNITED STATES PATENT OFFICE.

JOS. S. MANNING, OF PHILADELPHIA, PENNSYLVANIA.

IMPROVEMENT IN MOWING-MACHINES.

Specification forming part of Letters Patent No. 14,138, dated January 22, 1856.

*To all whom it may concern:*

Be it known that I, JOSEPH S. MANNING, of the city and county of Philadelphia, and State of Pennsylvania, have invented certain new and useful Improvements in Grass-Cutters or Harvesting-Machines; and I do hereby declare that the following is a full, clear, and exact description of the same, reference being had to the accompanying drawings, and to the letters of reference marked thereon, forming a part of this specification.

The nature of my improvement consists partially in the shape and construction of the tooth or finger for sustaining the grass or grain while an oscillating blade cuts it by passing under a fixed blade secured on the upper side of the tooth or finger. It is to be observed that this fixed blade is placed on a rib rising from the body of the tooth, thus closing the ordinary slot heretofore used, not only in those machines in which the sliding blade or reciprocating cutters are used, but also where the oscillating or scissor movement of the blade has been applied. By my dispensing with the slot entirely I prevent all possibility of choking consequent thereto by soft grass being drawn in the slot and lapping over the tooth, while its size may be materially reduced, and consequently its passage through the grain or grass greatly facilitated. Also, by my mode of adjusting the reciprocating motion to the fixed blade, by the relative position of the bearing-points to the bearings on which the blades work, I obtain a decided advantage not only in perfecting the cut thereof, but in giving additional security against filth passing between or wedging under the cap-plate, covering a portion of the cutters or blades, and sustain the blade itself against strain by the projections under it attached to the cutter-beam.

By constructing my frame so as to embrace the horse and drive the machine before him, in connection with the simplicity of giving motion to the cutters, I not only make an efficient machine, but at a materially reduced cost.

In the drawings, A A are the sides of a rectangular frame; B, the cutter-beam; C C', cross-timbers, to one of which the single-tree is connected. On the other is placed the driver's seat D.

E E are a pair of wheels, on which the frame is nearly balanced. They give motion to the cutters and reel by suitable gear, cords, and pulleys.

F is a pulley or windlass on a vertical crank-shaft. It is secured to the cross-piece C', and is for the purpose of raising and lowering the front of the frame and cutters thereon by winding the rope thereon.

*a a* are ropes or chains passing through a cross-bar, *b*, at the rear of the cutter-beam, and attachable to a shoulder-strap, *d*, passing over the animal operating the machine. The rear ends of the rope are wound around the pulley F. The ropes or chains *a a* have stop-rings *e e* passing through them below the cross-bar *b*, and thus make them serve the purpose of breast-chains in giving direction to the machine in the same manner as in a wagon or cart.

G G are small wheels or rollers for sustaining the front part of the machine in ordinary work.

The cutting portion is shown enlarged. H H are the diamond-shaped cutters, each pivoted on its pin or screw *f*, and attached to a reciprocating bar, I, moved by any suitable means.

J J are the fingers or teeth, having a central rib, *g*, interposed between the curved or angular recesses *h h*. This rib serves as a support to the stationary cutter *k*, fastened on the upper side of the finger.

B is the cutter-beam, giving support to the fingers or teeth projecting from its front edge. Between each tooth is an angular or circular projection, *m m*, united firmly with the bar and giving support to the cutters or blades. *m m* are made of metal, with a raised edge, and it is on these that the blades have their movement and support. (See dotted lines in Fig. 3.)

M is a cap-plate covering all of the cutters except the cutting portion. It lies on the ends of the fingers, and fits closely to the upper side of the cutters.

N is a reel; O, the platform on which the grain or grass is received from the cutters. From the close contact of the cutters or blades H with the cap M on the upper side and with the projection *m* on the under side, all possibility of grass being forced in is obviated, while by the want of the usual slot or opening in the finger grass cannot by any means lodge therein.

The object in placing the screw *f* behind the angular bearings *m m* is to cause the rising of the point of the cutters and make its contact with the stationary blade more perfect; and I would here remark that without the lower sustaining portion, P, of the finger the grass would be merely bent before the cutter and under the blade *k*, and would not be cut at all; but in my form of the finger the grass or grain is sustained above and below, without the disadvantage of the open slot or open guard.

The operation is as follows: The horse or mule moving forward, the cut grain falls upon a platform behind the reel, from which it is raked by a person thereon, being delivered at the side of the machine. The front of the machine, when working over unobstructed ground, runs upon a pair of low wheels or rollers, G; but in the event of a stump or stone being in front, or other obstruction, the driver on the seat D at the rear of the machine, by simply turning the windlass, draws the rope and raises the front of the machine and passes over the obstacle. This windlass is also useful in moving the machine either across the field or on the road. The machine being nearly balanced upon the driving-wheels, the preponderance of weight being in front, the raising of it by the windlass and the weight upon the animal's shoulder is rendered light and easy.

To hitch the horse in the machine it is only necessary to depress the rear of a machine (constructed of the proper proportions) and back him under it when raised.

Having described my improvements, what I claim as my invention, and desire to secure by Letters Patent, is—

1. Forming the teeth or fingers H H with a central rib, *g*, closing the usual slot, in combination with cutter-plate K and reciprocating blades H, constructed substantially as described, for the purpose of more effectually preventing clogging of the cutters, as set forth.

2. The device for elevating the cutter bar or beam, consisting of pulley or windlass F, ropes *a a*, and strap *d*, passing over the shoulders of the horse, arranged and operating in the manner set forth.

In testimony whereof I have hereunto signed my name before two subscribing witnesses.

JOS. S. MANNING.

Witnesses:
 JOHN F. CLARK,
 W. S. CLARK.